United States Patent
Abadie

(10) Patent No.: US 9,212,666 B2
(45) Date of Patent: Dec. 15, 2015

(54) ANNULAR CASING FOR A TURBINE ENGINE COMPRESSOR

(71) Applicant: SNECMA, Paris (FR)

(72) Inventor: Aude Abadie, Saint-Fargeau Ponthierry (FR)

(73) Assignee: SNECMA, Paris (FR)

( * ) Notice: Subject to any disclaimer, the term of this patent is extended or adjusted under 35 U.S.C. 154(b) by 675 days.

(21) Appl. No.: 13/687,548

(22) Filed: Nov. 28, 2012

(65) Prior Publication Data

US 2014/0212275 A1     Jul. 31, 2014

(30) Foreign Application Priority Data

Dec. 9, 2011  (FR) ...................... 11 61401

(51) Int. Cl.
- *F04D 29/40* (2006.01)
- *F01D 17/16* (2006.01)
- *F04D 29/56* (2006.01)

(52) U.S. Cl.
CPC ............ *F04D 29/403* (2013.01); *F01D 17/162* (2013.01); *F04D 29/563* (2013.01);
(Continued)

(58) Field of Classification Search
CPC ..... F01D 17/162; F01D 25/183; F01D 25/24; F01D 9/041; F01D 9/065; F04D 29/563; F04D 29/403; F04D 25/06; F04D 25/068; F04D 29/424; F04D 27/0292; F04D 29/4206; F04D 17/04; F04D 19/002; F04D 25/04; F04D 25/0606; F04D 25/088; F04D 29/02; F04D 29/329; F04D 29/34; F04D 29/542; F04D 29/601; F04D 29/70; F04D 3/02; F04C 18/084; F04C 18/16; F05D 2230/64; F05D 2240/54; F05D 2300/434; F05D 2300/603; F05D 2220/327; F05D 2300/43; F05D 2300/614; F05D 2300/702; F05D 2240/128; Y02E 30/40; Y02E 40/625; Y02E 10/28; Y02E 10/47; Y02E 10/50; Y02E 10/721; Y02E 10/22; Y02E 10/223; Y02E 10/38; Y02E 10/725; Y02E 10/74; Y02E 30/10; Y02E 60/366; F02C 3/145; F03B 17/061; F03B 13/083; F03B 17/062; F03B 3/14; F03D 1/04; F03D 1/025; F03D 1/0658; F03D 3/002

USPC ................................... 415/160, 162
See application file for complete search history.

(56) References Cited

U.S. PATENT DOCUMENTS 3,329,455 A  *  7/1967  Becker et al. .................. 403/76
4,812,106 A     3/1989  Purgavie
(Continued)

FOREIGN PATENT DOCUMENTS

| DE | 24 26 824 A1 | 1/1976 |
|----|--------------|--------|
| EP | 0 375 593 A1 | 6/1990 |

(Continued)

OTHER PUBLICATIONS

Jon Binner, Paul Hogg and John Murphy, Advanced Materials Source Book, Elsevier Science, 1994, p. 171.*
(Continued)

*Primary Examiner* — Troy Chambers
*Assistant Examiner* — Joshua Semick
(74) *Attorney, Agent, or Firm* — Oblon, McClelland, Maier & Neustadt, L.L.P.

(57) ABSTRACT

A metal annular casing (16) for a turbine engine compressor, the casing having at least one annular row of radial chimneys for receiving outer cylindrical pivots of variable-pitch vanes, together with an outer cylindrical centering track (28) that is continuous or interrupted and against which runners carried by an annular ring for controlling the pitch of the vanes are to come to bear, the casing being characterized in that the track is formed by blocks (30) of plastics material fitted onto the casing and that are fastened or held on the casing.

9 Claims, 2 Drawing Sheets

(52) U.S. Cl.
CPC ......... *F05D2230/64* (2013.01); *F05D 2240/54* (2013.01); *F05D 2300/434* (2013.01); *Y02T 50/671* (2013.01)

(56) References Cited

U.S. PATENT DOCUMENTS

| | | | |
|---|---|---|---|
| 4,925,364 A | | 5/1990 | Das |
| 4,948,331 A | * | 8/1990 | Roy et al. .................. 415/20 |
| 5,601,401 A | | 2/1997 | Matheny et al. |
| 2005/0063780 A1 | * | 3/2005 | Thorne ..................... 404/41 |
| 2005/0271503 A1 | * | 12/2005 | Harper et al. ............. 415/170.1 |
| 2006/0133925 A1 | * | 6/2006 | Bouru ...................... 415/160 |
| 2007/0183889 A1 | | 8/2007 | Bromann |
| 2009/0116954 A1 | * | 5/2009 | Bouru et al. ................ 415/125 |

FOREIGN PATENT DOCUMENTS

| | | |
|---|---|---|
| EP | 1 820 942 A1 | 8/2007 |
| FR | 2 617 544 A1 | 1/1989 |

OTHER PUBLICATIONS

French Preliminary Search Report issued Aug. 21, 2012 in corresponding French Application No. 11 61401 filed Dec. 9, 2011 (with an English Translation of Categories).

* cited by examiner

ANNULAR CASING FOR A TURBINE ENGINE COMPRESSOR

The invention relates to an annular casing for a turbine engine compressor, the compressor having at least one stage of variable-pitch nozzle vanes.

BACKGROUND OF THE INVENTION

In a turbine engine compressor, the variable-pitch nozzle stages are mounted downstream or upstream from rotor wheels of compression stages. The variable-pitch vanes in each nozzle stage are carried by the annular casing and they are adjustable in angular position about their respective axes in order to optimize the flow of gas through the core of the turbine engine.

Each variable-pitch vane has a substantially cylindrical axial pivot at each of its ends, these pivots defining the pivot axis of the vane. The radially outer pivot is engaged in a substantially radial chimney of the casing and it is connected by a lever to a control ring that extends around the casing and that is generally actuated by an actuator. A turning movement of the control ring about the longitudinal axis of the casing is transmitted by the levers to the outer pivots of the vanes, thereby causing the vanes to pivot about their axes.

In operation, the control ring tends to deform or to come out of alignment with the longitudinal axis of the casing, and possibly also to be offset from a radial plane. In order to limit or prevent this phenomenon, it is known to fit the control ring with runners for bearing against an outer cylindrical track of the casing, with the control ring extending around the track. The runners of the control ring co-operate with the track of the casing to keep the ring centered in spite of the off-centering forces that result from the thrust of the actuator and the reactions of the levers connected to the vanes.

In the prior art, the casing is made of a metal alloy and its control ring centering track(s) is/are made integrally with the casing in the form of local annular extra thicknesses of the casing. Each of these extra thicknesses serves solely to create a centering track and it does not have any function of reinforcing or stiffening a zone of the casing. Nevertheless, the extra thickness leads to a significant increase in the weight of the casing. Furthermore, the cylindrical track is made by milling, thereby increasing the time required for fabricating the casing, and thus increasing its cost.

It should also be understood that the tilting behavior of the vanes, when worn, is improved by the vanes having outer pivots of a radial size that is large, however that causes the control ring to be further away from the casing and thus increases the extra thickness constituted by the track on the casing. In other words, if it is desired to improve the behavior of the vanes in operation by increasing the radial size of their outer pivots, that leads automatically to a significant increase in the outside diameter of the track and thus to an increase in the weight of the casing.

SUMMARY OF THE INVENTION

An object of the invention is to provide a solution to those problems of the prior art that is simple, effective, and inexpensive.

To this end, the invention provides a metal annular casing for a turbine engine compressor, the casing having at least one annular row of radial chimneys for receiving outer cylindrical pivots of variable-pitch nozzle vanes, together with an outer cylindrical centering track that is continuous or interrupted and against which runners carried by an annular ring for controlling the pitch of the vanes are to come to bear, the casing being characterized in that the track is formed by blocks of plastics material fitted onto the casing and in that the casing includes means for retaining the blocks axially, these retaining means comprising one or two annular walls that are formed integrally with the casing and that extend radially outwards upstream and/or downstream relative to the blocks.

The centering track of each control ring is thus made of a plastics material or a polymer, i.e. a material that is much lighter than the metal alloy of the casing and that enables the weight of the casing to be reduced significantly.

In an embodiment of the invention, the casing is made of steel that has a density of 7.76 kilograms per cubic decimeter ($kg/dm^3$) and the centering track of the ring is made of polyimide (such as Vespel®) that has a density of $1.15\,kg/dm^3$. For a given volume, the plastics material track therefore presents a weight that is about one-sixth the weight of a track made up of extra thicknesses of a casing as in the prior art. The invention thus makes it possible to reduce the overall weight of a compressor casing of a turbine engine of small size by about 500 grams (g).

In addition, because the track is eliminated, the equivalent zone on the casing can be machined directly on a lathe instead of being milled. Finally, the outside diameter of the track can be optimized as a function of the radial size of the outer pivots of the vanes, without suffering constraints associated with the impact of this diameter on the weight of the casing.

The invention thus makes it possible to lighten a compressor casing and also makes it possible to improve the sliding of the runners carried by the control ring on the track of the casing by selecting an appropriate plastics material for the blocks (e.g. a material having a low coefficient of friction).

The plastics material blocks are sectors of a ring, i.e. they are of a shape that is curved, which shape is preferably substantially complementary to the shape of the zone of the casing on which they are to be fastened or held. The casing of the invention has means for fastening and/or holding the blocks, which blocks may be arranged circumferentially end to end in order to form a continuous track, or the contrary they may be spaced apart circumferentially from one another so as to form a track that is interrupted or discontinuous, thus allowing the blocks to expand thermally in operation.

Furthermore, if it becomes worn, the track can easily be replaced during a maintenance operation by removing some or all of the blocks and replacing them with new blocks.

The plastics material blocks may be fastened on the casing by adhesive. This particularly simple embodiment is preferred when the materials of the casing and of the blocks have coefficients of thermal expansion that are relatively close together and therefore present similar expansion behaviors. Advantageously, the adhesive used is capable of accommodating the shear forces caused in operation by the differential thermal expansions of the casing and of the blocks.

The casing of the invention may include means for retaining the blocks axially, these retaining means comprising one or two annular walls that are formed integrally with the casing and that extend radially outwards, upstream and/or downstream from the blocks. When the zone of the casing on which the blocks are mounted is generally cylindrical in shape, the casing advantageously has two annular walls, respectively an upstream wall and a downstream wall, with the blocks being mounted between them. When this zone is generally frustoconical in shape, the casing may have a single annular wall for retaining the blocks axially, with this wall being formed at the smaller diameter end of the zone. The frustoconical shape of the blocks co-operates with the complementary frustoconical shape of the casing to prevent any axial movement of the blocks away from the above-mentioned wall.

The above-mentioned annular wall(s) may extend continuously over 360°, or may, on the contrary, be discontinuous. Each wall sector advantageously has an angular extent that is greater than the angular extent of a block, and it may include a circumferential end portion for retaining a block and an opposite circumferential end portion for retaining an adjacent block.

The or at least one of the above-mentioned casing walls has a section that is L-shaped and includes at its outer periphery a cylindrical rim for retaining the blocks radially. This rim is to prevent the blocks from extending outwards, and it may be continuous, or on the contrary it may be discontinuous. If it is discontinuous, it may be made up of a plurality of rim sectors that are spaced apart from one another, each sector having a circumferential end portion extending around one block and an opposite circumferential end portion extending around an adjacent block.

Each block may include means co-operating by connecting shapes with complementary means of the or one of the above-mentioned walls to prevent the block from turning relative to the casing. Each block may for example have an axial lug engaged in a notch of complementary shape in a wall of the casing, the lug co-operating in circumferential abutment with the side walls of the notch in order to prevent the block from turning on the casing.

The blocks may be designed to interfit one in another, with the circumferential ends of each block being designed to be mutually engaged with the circumferential ends of the adjacent blocks. For this purpose, each block may include a tongue at one of its circumferential ends for engaging in a recess of complementary shape at the facing circumferential end of an adjacent block.

The blocks may also include orifices at their circumferential ends for passing a safety wire that is to pass through the orifices in the facing circumferential ends of two adjacent blocks.

The blocks may include at least one annular groove that is open in a radially outward direction and in which a taut annular cable is housed for holding the blocks and clamping them radially against the casing. This groove may be formed in the cylindrical track defined by the blocks. The blocks may have two annular grooves of this type, each of which receives a respective taut cable for providing good safety by redundancy of the block-holding means.

The present invention also provides a turbine engine, such as an airplane turboprop or turbojet, the engine being characterized in that it includes a casing as described above.

BRIEF DESCRIPTION OF THE DRAWINGS

The invention can be better understood and other details, advantages, and characteristics of the invention appear on reading the following description made by way of non-limiting example and with reference to the accompanying drawings, in which.

MORE DETAILED DESCRIPTION

Figure 1:
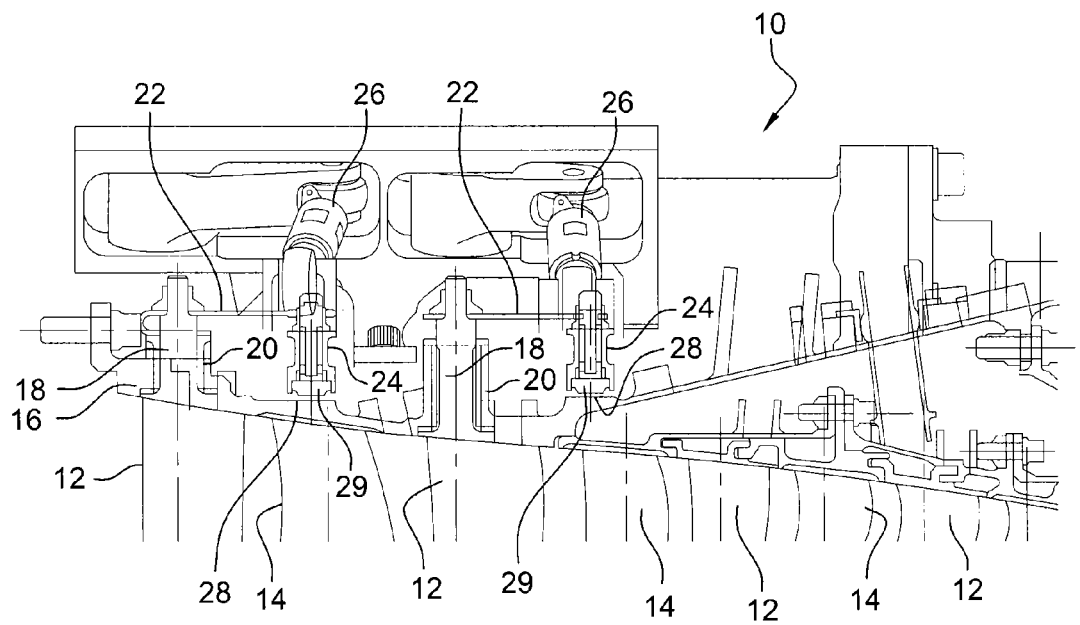
FIG. 1 is a fragmentary diagrammatic half-view in axial section of a turbine engine compressor, the compressor having a casing of the prior art.
Figure 2:
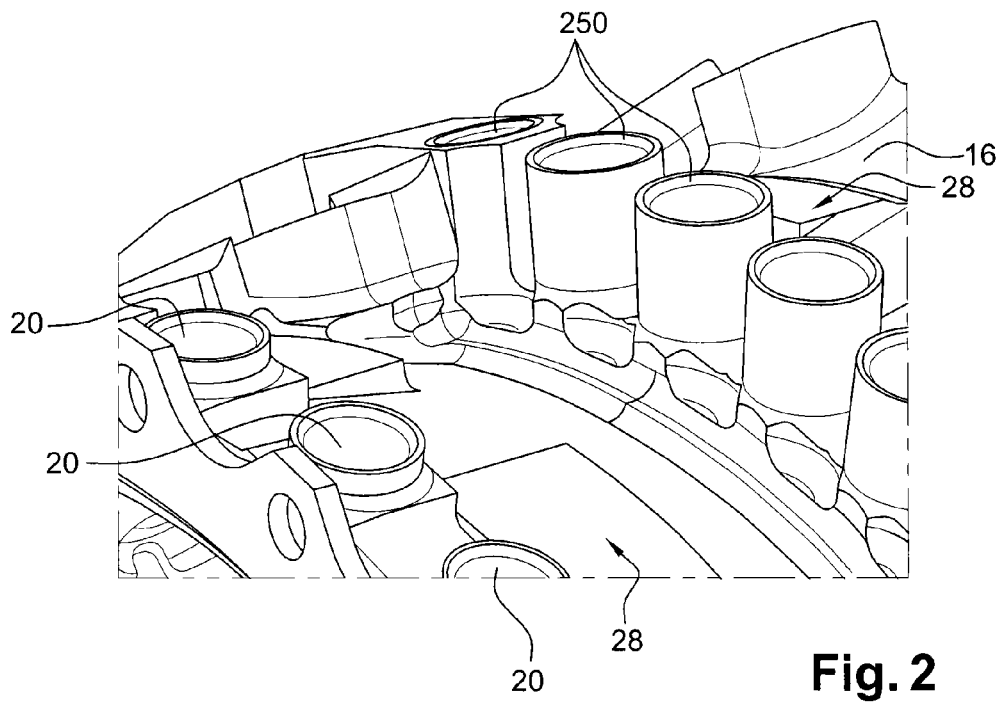
FIG. 2 is a fragmentary diagrammatic view in perspective of the casing of the FIG. 1 compressor.

Reference is made initially to FIGS. 1 and 2 which show a low pressure compressor 10 of a turbine engine of the art prior to the invention, the compressor comprising a plurality of compression stages, each having an annular row of variable-pitch nozzle vanes 12 and an annular row of rotary blades 14 arranged downstream from the row of nozzle vanes.

The compression stages are surrounded by a substantially cylindrical outer casing 16 that carries the nozzle vanes 12. The nozzle vanes 12 are pivotally-mounted on the casing 16 to turn about axes that are radial relative to the longitudinal axis of the compressor, and only their radially outer portions are shown in the drawings.

Each vane 12 has a radially outer cylindrical pivot 18 that extends inside a radially cylindrical chimney 20 of the casing 16 and that has its radially outer end connected by a lever 22 or a link to a control ring 24 that extends around the casing and that is movable in turning about the longitudinal axis of the compressor. The control ring 24 is connected by the levers 22 to the outer pivots 18 of all of the vanes in a given row, and it is turned about the above-mentioned axis by means of an actuator 26 or the like carried by the casing 16.

The compressor 10 shown in the drawings has two annular rows of variable-pitch nozzles vanes 12, two control rings 24, and two actuators 26 for driving those rings.

The casing 16 of the compressor has two annular rows of radial chimneys 20 with an outer cylindrical track 28 being formed in the vicinity of those rows for centering a corresponding control ring 24. On its inner periphery, each control ring 24 carries runners 29 for bearing against and sliding on a cylindrical track 28 of the casing in order to keep the control ring centered on the longitudinal axis of the compressor.

In the prior art as shown in FIGS. 1 and 2, the track 28 is discontinuous (it does not extend continuously over 360°— see FIG. 2) and it is formed by local extra thicknesses of the casing 16. The track 28 is thus made integrally with the casing 16 and the extra thicknesses of the casing leads to a significant increase in the weight of the casing, which is made of a metal alloy such as a steel.

The invention enables this problem to be solved by making the track for centering a control ring by means of blocks of plastics material that are fitted onto the casing and that are fastened or held on the casing by appropriate means. The blocks of plastics material are of density that is much less than the density of the material of the casing, thereby leading to a reduction in the weight of the casing.

By way of example, the blocks of the invention are made of Vespel® (polyimide).

Figure 3:
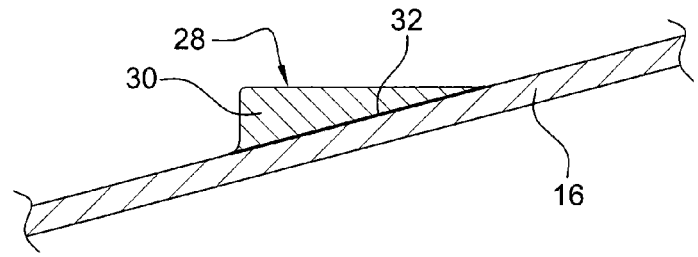
FIG. 3 is a fragmentary and very diagrammatic half-view in axial section of the casing of the invention.

FIG. 3 shows a first embodiment of the invention in which the plastics material blocks 30 that define the centering track 28 are fastened to the outside surface of the casing 16 by adhesive 32. The blocks 30 are circumferentially arranged ring sectors and each of them has an inner surface of a shape that is complementary to the shape of the outer surface of the casing 16 onto which they are adhesively bonded. Their outer cylindrical surfaces define the centering track 28 for the runners of a control ring of the above-mentioned type.

In the example shown, the casing 16 is frustoconical in shape and the inner surface of each block 30 is also frustoconical. The blocks 30 may be bonded to the casing 16 so as to be circumferentially spaced apart from one another, thereby defining a discontinuous track 28 similar to that shown in FIG. 2.

The adhesive 32 that is used may for example be an epoxy type adhesive or a CAF® type silicone adhesive. The adhesive may be selected for its properties relating to thermal expansion, high temperature behavior, and/or acceptable shear stress, and the bonding may be total or partial. These dimensioning constraints may depend on the operating conditions of the engine.

Figure 4:
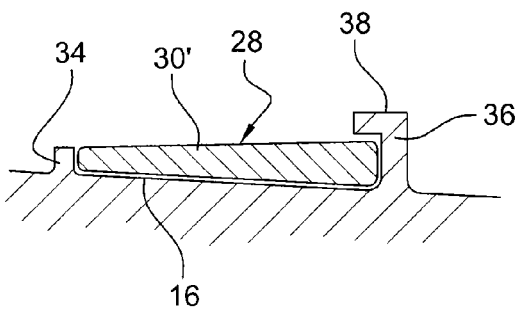
FIG. 4 is a fragmentary and very diagrammatic half-view in axial section of a variant embodiment of the casing of the invention.
Figure 5:
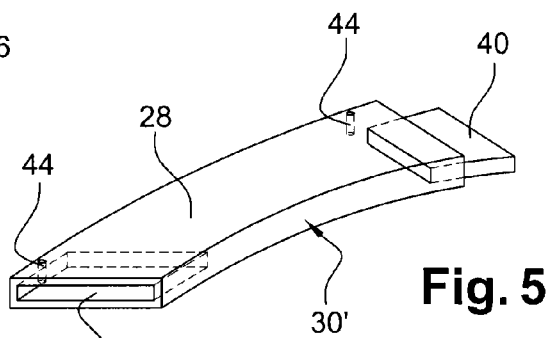
FIG. 5 is a diagrammatic view in perspective of a block of plastics material for forming the track of the FIG. 4 casing.

FIGS. 4 and 5 show a variant embodiment of the invention in which the casing 16 has means 34, 36, and 38 for retaining the plastics material blocks 30' both axially and radially, which blocks are arranged circumferentially end to end and have ends that are engaged circumferentially one in another.

The means for retaining the blocks 30' axially on the casing are formed by two annular walls 34 and 36 that extend radially outwards respectively upstream and downstream from the blocks 30', these walls 34 and 36 being formed integrally with the casing. The downstream annular wall 36 presents a section that is substantially L-shaped and that has an upstream cylindrical rim 38 overlying a portion of the downstream sides of the blocks 30' in order to ensure they are held radially against moving outwards. The walls 34 and 36 and the rim 38 may extend continuously over 360°, or alternatively they may be discontinuous, as explained above.

The axial distance between the walls 34 and 36 is substantially equal to the axial dimension of the blocks 30', which blocks are engaged between these walls and radially on the inside of the rim 38 by a small amount of elastic deformation.

As can be seen in FIG. 5, each block 30' is arranged circumferentially and has a tenon-forming tongue 40 at a first circumferential end that is suitable for being engaged in a mortice-forming recess of complementary shape at the facing circumferential end of an adjacent block, while at its second circumferential end it has a recess 42 of the above-described type that is to receive a tongue of complementary shape at the facing circumferential end of another adjacent block.

The blocks 30' also include orifices 44 at their circumferential ends for passing safety wires (not shown) for securing the blocks to one another and preventing them from disengaging in operation. Each safety wire is for passing through the orifice 44 at a circumferential end of one block and through the orifice at a circumferential end of an adjacent block, and it may also pass through an orifice in the rim 38 of the casing 16 in order to prevent the blocks from turning relative to the casing.

Figure 6:
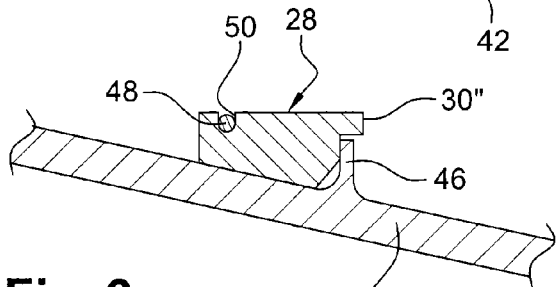
FIG. 6 is a fragmentary and very diagrammatic half-view in axial section of another variant embodiment of the casing of the invention.
Figure 7:
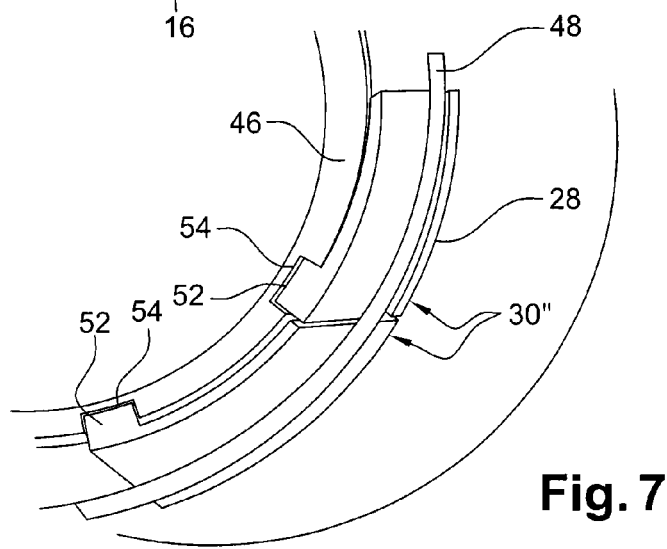
FIG. 7 is a fragmentary diagrammatic view in perspective of the track of the FIG. 6 casing.

FIGS. 6 and 7 show another variant embodiment of the invention in which the casing 16 has a single annular wall 46 for axially retaining the circumferentially-arranged plastics-material blocks 30" which are pressed radially against the casing by means of a taut cable 48 extending around the blocks.

The zone of the casing 16 on which the blocks 30" are mounted is generally frustoconical in shape in this example and the annular wall 46 extends downstream from the blocks 30" from a smaller-diameter portion of this zone.

The taut cable 48 is received in an annular groove 50 in the blocks, which groove is formed in the track 28 and is radially open in an outward direction. The cable 48 is fully engaged in the groove 50 with its outside diameter being less that the outside diameter of the groove.

The blocks 30" are prevented from moving axially in a downstream direction by the wall 46, and they are prevented from moving upstream by co-operation between the taut cable clamping the blocks radially and the frustoconical shape of the casing 16.

Each block 30" includes an axial lug 52 at its downstream end that is engaged in a notch 54 of complementary shape in the wall 46 so as to prevent the block from turning relative to the casing.

The invention claimed is:

1. A metal annular casing for a turbine engine compressor, the casing comprising:
    at least one annular row of radial chimneys for receiving outer cylindrical pivots of variable-pitch vanes; and
    an outer cylindrical centering track that is continuous or interrupted and against which runners carried by an annular ring for controlling the pitch of the vanes are to come to bear,
    wherein the track is formed by blocks of plastics material fitted onto the casing,
    wherein the casing includes means for retaining the blocks axially, the retaining means comprising two annular walls that are formed integrally with the casing and that extend radially outwards, the walls being upstream and downstream relative to the blocks, and
    wherein an axial distance between the walls is substantially equal to an axial length of the blocks.

2. The casing according to claim 1, wherein the blocks are fastened on the casing by adhesive.

3. The casing according to claim 1, wherein at least one of the walls has a section that is L-shaped and includes at an outer periphery thereof a cylindrical rim for retaining the blocks radially.

4. The casing according to claim 1, wherein each block includes means co-operating by connecting shapes with complementary means of the walls to prevent the block from turning relative to the casing.

5. A metal annular casing for a turbine engine compressor, the casing comprising:
    at least one annular row of radial chimneys for receiving outer cylindrical pivots of variable-pitch vanes; and
    an outer cylindrical centering track that is continuous or interrupted and against which runners carried by an annular ring for controlling the pitch of the vanes are to come to bear,
    wherein the track is formed by blocks of plastics material fitted onto the casing,
    wherein the casing includes means for retaining the blocks axially, the retaining means comprising at least one annular wall that is formed integrally with the casing, extends radially outwards, and is upstream or downstream relative to the blocks, and
    wherein each block includes a tongue at one of a circumferential end thereof for engaging in a recess of complementary shape at the facing circumferential end of an adjacent block.

6. A metal annular casing for a turbine engine compressor, the casing comprising:
    at least one annular row of radial chimneys for receiving outer cylindrical pivots of variable-pitch vanes; and
    an outer cylindrical centering track that is continuous or interrupted and against which runners carried by an annular ring for controlling the pitch of the vanes are to come to bear,
    wherein the track is formed by blocks of plastics material fitted onto the casing,
    wherein the casing includes means for retaining the blocks axially, the retaining means comprising at least one annular wall that is formed integrally with the casing, extends radially outwards, and is upstream or downstream relative to the blocks, and
    wherein the blocks include orifices at circumferential ends thereof for passing safety wires, each safety wire serving to pass through the orifices of the facing circumferential ends of two adjacent blocks.

7. A metal annular casing for a turbine engine compressor, the casing comprising:
- at least one annular row of radial chimneys for receiving outer cylindrical pivots of variable-pitch vanes; and
- an outer cylindrical centering track that is continuous or interrupted and against which runners carried by an annular ring for controlling the pitch of the vanes are to come to bear,
- wherein the track is formed by blocks of plastics material fitted onto the casing,
- wherein the casing includes means for retaining the blocks axially, the retaining means comprising at least one annular wall that is formed integrally with the casing, extends radially outwards, and is upstream or downstream relative to the blocks, and
- wherein the blocks include at least one annular groove that is open in a radially outward direction and in which an annular cable is housed for holding the blocks and clamping the blocks radially against the casing.

8. The casing according to claim 1, wherein the blocks are made of an engineering plastic.

9. A turbine engine, which includes a casing according to claim 1.

\* \* \* \* \*